(12) United States Patent
Van Der Sluis et al.

(10) Patent No.: US 7,915,343 B2
(45) Date of Patent: *Mar. 29, 2011

(54) SLIP- AND LEVELING AGENT

(75) Inventors: Marcelles Van Der Sluis, Groningen (NL); Wendy Gezina Hof, Groningen (NL); Lothar Alexander Engelbrecht, Heerenveen (NL); Steffen Onclin, Basel (CH)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/227,252

(22) PCT Filed: May 8, 2007

(86) PCT No.: PCT/EP2007/054417
§ 371 (c)(1),
(2), (4) Date: Nov. 12, 2008

(87) PCT Pub. No.: WO2007/134959
PCT Pub. Date: Nov. 29, 2007

(65) Prior Publication Data
US 2009/0176929 A1    Jul. 9, 2009

(30) Foreign Application Priority Data

May 18, 2006    (EP) .................................... 06114175

(51) Int. Cl.
*C08F 8/00* (2006.01)
(52) U.S. Cl. ........ 525/101; 525/166; 525/186; 525/190; 525/411; 525/412; 525/445; 525/446; 525/447; 525/451
(58) Field of Classification Search .................. 525/102, 525/166, 176, 190, 411, 412, 444, 445, 446, 525/447, 451, 101, 186
See application file for complete search history.

(56) References Cited

U.S. PATENT DOCUMENTS

| 5,650,483 | A | 7/1997 | Malik et al. |
| 5,929,134 | A * | 7/1999 | Lent et al. ..................... 523/161 |
| 2002/0143087 | A1 | 10/2002 | Haubennestel et al. |
| 2004/0048957 | A1 | 3/2004 | Medsker et al. ............... 524/107 |
| 2004/0171775 | A1 | 9/2004 | Yamamoto et al. ........... 526/247 |
| 2004/0236007 | A1 * | 11/2004 | Pirrung et al. ................ 524/544 |

FOREIGN PATENT DOCUMENTS

| EP | 0 783 023 | | 7/1997 |
| WO | WO 01/48051 | A1 | 7/2001 |
| WO | WO 2006/125731 | A1 | 11/2006 |
| WO | WO 2007/025885 | A1 | 3/2007 |

OTHER PUBLICATIONS

Omnova POLYFOX® Product Data Sheet, 2005, p. 1-4 [online], accessed via the Internet [retrieved on Nov. 23, 2009], URL:<http://web.archive.org/web/20060311050543/www.omnova.com/products/chemicals/documents/BW-PC-SPEC-POLYFOX_pdfDiols_Solvent_AppsF.pdf>.*

* cited by examiner

*Primary Examiner* — David Wu
*Assistant Examiner* — Robert Jones
(74) *Attorney, Agent, or Firm* — Shiela A. Loggins

(57) ABSTRACT

The invention relates to a new modified polyacrylate comprising fluorinated oxetane (FOX) polymer units functionalized with an unsaturated dicarboxylic acid and siloxane units and to its use as slip- and leveling agent and anti-cratering agent for a variety of applications. Thus, the invention relates to a slip- and leveling agent characterized in that it comprises a copolymer which is obtained by copolymerizing A at least one unit of a fluorinated oxetane polymer functionalized with an unsaturated dicarboxylic acid; B at least one terminal reactive polysiloxane unit; C at least one alkyl(meth)acrylate unit or cycloalkyl(meth)acrylate unit and/or (meth)acrylic acid and/or other units originating from vinylic compounds that can form radicals.

13 Claims, 1 Drawing Sheet

SLIP-AND LEVELING AGENT

The invention relates to a new modified polyacrylate comprising fluorinated oxetane (FOX) polymer units functionalized with unsaturated dicarboxylic acid and siloxane units and to its use as slip- and leveling agent and anti-cratering agent for a variety of applications.

Since decades, organically modified polysiloxanes are successfully being used as slip and leveling enhancing additives in the coatings and graphic arts industries. Siloxane-based polymers display many desirable properties including low surface energies, high flexibility, low toxicity, and biocompatibility. At a later stage, polyacrylates with perfluorocarbon side chains have been introduced. Fluorocopolymers are advantageous for numerous applications because of their thermal stability, chemical resistance, low surface energy, and hydrophobic character. These properties make fluorocopolymers particularly well-suited to coatings and paint applications and are well accepted in the market as effective surface active additives for reduction of the surface tension of liquid media to ensure substrate wetting and anti-cratering properties. Combining in a single molecule the unique properties of both fluorinated polymers and polysiloxanes might provide interesting new materials.

The combination of both (polysiloxane and perfluoroalkyl moieties) in a polyacrylic structure combine their beneficial effects on a low coefficient of friction, excellent slip, anti-cratering and complete substrate wetting. Simultaneously, these novel additives should not exhibit intercoat adhesion problems, nor should they give foam stabilization.

U.S. Pat. No. 6,710,127 (Byk) describes a leveling agent which is a branched polymer comprising a polymeric backbone molecule into which macromonomeric units such as polydimethyl-siloxanes or perfluoroalkyl acrylates have been incorporated.

WO03/033603 (Ciba) corresponding to US2004236007 describes the use of a polymer as a leveling agent or anti-cratering agent, said polymer comprising units of certain ester moieties of unsaturated dicarboxylic-acids with certain fluorinated units. Preferred co-monomers include alkyl(meth)acrylate units and/or (meth)acrylic acid and/or other vinylic compounds.

WO03/033603 does not contain a monomeric unit containing a terminal reactive poly-siloxane.

The International publication WO2006125731 (Ciba) relates to a slip- and leveling agent characterized in that it comprises a copolymer which is obtained by copolymerizing A at least one unit of a mono- or di perfluoroester of an unsaturated dicarboxylic-acid;
B at least one terminal reactive polysiloxane unit;
C at least one alkyl(meth)acrylate unit or cycloalkyl(meth)acrylate unit and/or (meth)acrylic acid and/or other units originating from vinylic compounds that can form radicals.

WO01/48051 (Omnova) describes mono functionalised polyfluoroxetanes in which the functional group comprises (meth)acrylate, allylic, melamine, amine, acetylacetate, epoxy, silyl or isocyanate groups.

U.S. Pat. No. 5,650,483 (Aerojet-General Corp.) is directed to novel fluorinated polymers and prepolymers derived from mono-substituted oxetane monomers having fluorinated alkoxymethylene side-chains and the method of making these compositions.

There is still a need for improved slip- and leveling agents having enhanced surface properties such as a good anti-cratering performance, a low coefficient of friction, a good intercoat adhesion and in addition show a good foam control.

SUMMARY

It has now been found that a modified polyacrylate comprising fluorinated oxetane (FOX) polymer units functionalized with an unsaturated dicarboxylic acid and further comprising monoethylenically unsaturated polydimethylsiloxane units are very suitable slip- and leveling agents. Improved slip properties are obtained compared to leveling agents containing perfluoroester units of an unsaturated dicarboxylic-acid as disclosed in WO03/033603.

Accordingly, the present invention relates to a slip- and leveling agent characterized in that it comprises a copolymer which is obtainable by copolymerizing A at least one unit of a fluorinated oxetane polymer functionalized with an unsaturated dicarboxylic acid;
B at least one terminal reactive polysiloxane unit;
C at least one alkyl(meth)acrylate unit or cycloalkyl(meth)acrylate unit and/or (meth)acrylic acid and/or other units originating from vinylic compounds that can form radicals.

Advantage:

The use of a slip- and leveling agent according to the invention gives benefits such as a low coefficient of friction, excellent slip, complete wetting of the substrate. It helps to prevent the formation of craters and pin-holes, to provide a smooth and/or equal leveling of the paint film without orange peel leading to improved aesthetics of the dry film. Also, edge crawling, air-draft sensitivity, fish eyes and/or other dewetting effects of the liquid resin solution during the drying stage may be avoided or at least reduced significantly.

Additionally, it has been found that such a slip- and levelling agent exhibits low foam properties. All this may be achieved without loosing overcoatability of the dry film.

BRIEF DESCRIPTION OF THE DRAWING

The accompanying drawing, which is incorporated herein and constitutes part of this specification, together with the general description given above and the detailed description given below, serve to explain features of the invention.

DETAILED DESCRIPTION OF PREFERRED EMBODIMENTS

Definitions

Figure 1:
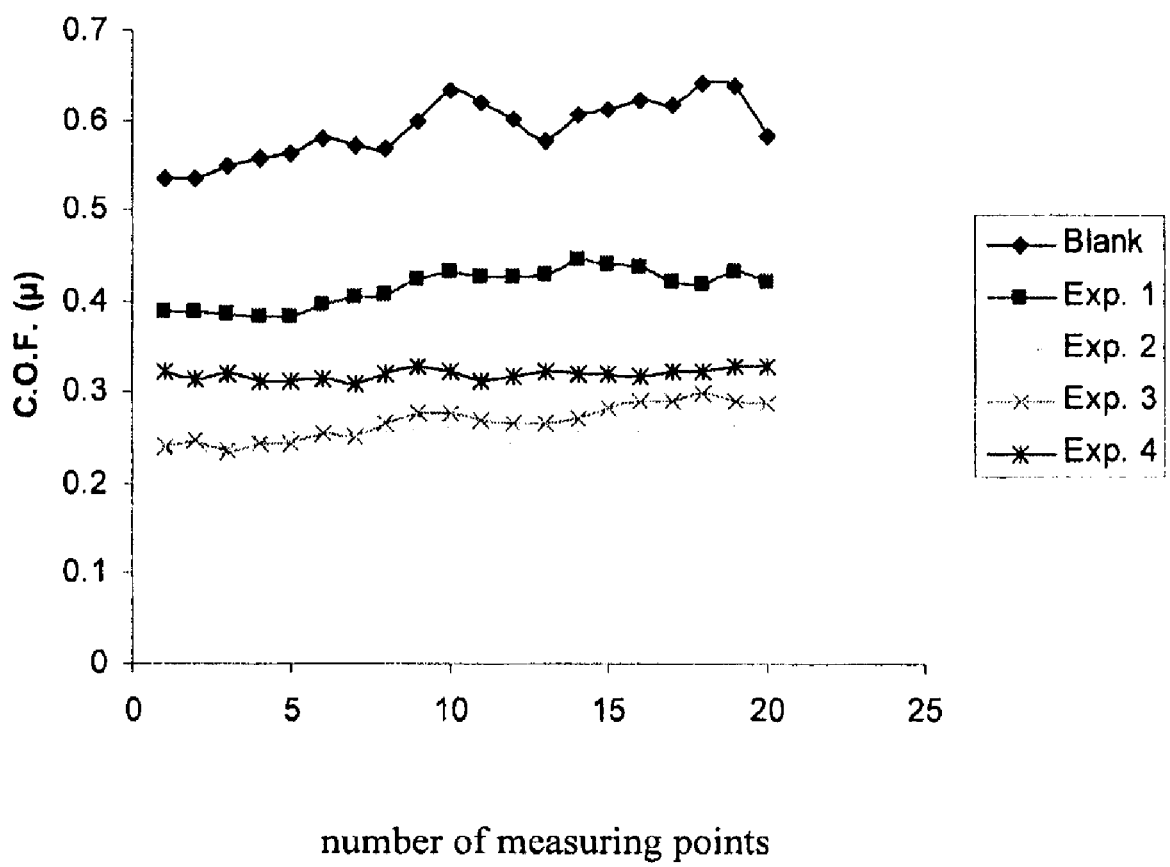
FIG. 1 is a line graph representing the results of a coefficient of friction test.

The fluorinated oxetane polymer functionalized with an unsaturated dicarboxylic acid are mono- or diesters and may be represented by formula I,

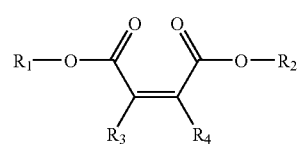

(Formula I)

wherein
R¹ is a unit derived from a fluorinated oxetane prepolymer having the structure II

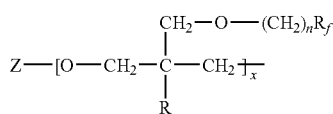

wherein R is $C_1$-$C_6$-alkyl, $R_f$ is a linear or branched chain perfluorinated alkyl or isoalkyl groups having 1 to 20 C-atoms, n is 1 to 3, x is 2 to 20; Z is hydrogen or $CF_3CH_2$— or
HO—CO—$CR_3$=$CR_4$—CO—,  or  $R_1$—O—CO—$CR_3$=$CR_4$—CO— where $R_1$ is as defined above;
$R^2$ is hydrogen or $R_1$;
$R^3$ and $R^4$ are independently hydrogen or $C_1$-$C_6$-alkyl or phenyl.

Preferably $R_3$ and $R_4$ are hydrogen and R is methyl or ethyl.

The fluorinated oxetane prepolymers and their preparation are described in U.S. Pat. No. 5,650,483 or are commercially available from Omnova Solutions Inc. under the tradename Polyfox.

Preferably Rf is —$CF_3$, —$CF_2$—$CF_3$, —$CF_2$—$CF_2$—$CF_3$, more preferably —$CF_3$, —$CF_2$—$CF_3$.

Preferably n is 1 and x is 6 to 20.

Very good results have been achieved when using a copolymer wherein at least 50%, preferably 70-100% of the fluorinated units of the copolymer are represented by formula I.

In a preferred embodiment of the invention at least 50%, preferably 90-100% of the compound of formula I are mono-esters. ($R_2$=H).

An advantage of using a copolymer with a high level of monoesters, is related to the ease of manufacturing such esters. Another advantage is the fact that the polymer can be rendered water-soluble in an efficient way through neutralisation of the remaining $CO_2H$-groups.

Suitable unsaturated dicarboxylic acid monomers include, for example, maleic acid, maleic anhydride, methylmaleic anhydride, fumaric acid, methylfumaric acid and alkali and metal salts thereof. Maleic acid is preferred.

The terminal reactive polysiloxane compound has at least one polymerizable unsaturated group such as an acryloxy group, methacryloxy group, vinyl group, propenyl group, butadienyl group, styryl group, ethynyl group, maleate group or acrylamide group.

Polydimethylsiloxane compounds are preferable in view of easy availability.

The terminal reactive polysiloxane may be prepared by a known method, or it is commercially available. Examples of commercial products are Silaplane FM-0711, FM-0721, FM-0725, FM-0511, FM-0521, FM-0525, TMO701, TMO701T (manufactured by Chisso Corp.), SLM 446008-15, SLM 446008-50, SLM 446008-65, SLM 446014-15, SLM 446014-65 (manufactured by Wacker Chemie GmbH) and the like can be given.

To prepare the reactive polysiloxanes, a mono-OH functional silicone compound, for example, those commercially available under the trade names of, Silaplane FM-0411, FM-0421, FM-0425, FM-D411, FM-D421, FM-D425, FM-DA11, FM-DA21, FM-DA25 (manufactured by Chisso Corp.), can be reacted with a compound having a polymerizable unsaturated group as defined above, for example reaction with (meth)acryloyl chloride, allylchloride; or by esterifying them with (meth)acrylic acid or maleic acid.

Examples of mono-OH functional groups are 3-(2'-hydroxyethoxy)propyl, 3-(2'-ethyl-2'-hydroxymethyl-3-hydroxy)propyl or 3-(2'-hydroxy-3'-isopropylamino)propyl.

Alkyl(meth)acrylate or cycloalkyl(meth)acrylate units and/or (meth)acrylic acid and/or other units originating from vinylic compounds that can form radicals are e.g. styrene, n-propyl methacrylate, 2-methyl cyclohexyl methacrylate, ethylene glycol mono-methacrylate, tert-butylacrylate, iso-butyl methacrylate, iso-butyl acrylate, o-cresyl methacrylate, t-butyl methacrylate, n-butyl acrylate, n-butyl methacrylate, methylacrylate, methyl methacrylate, ethylacrylate, propylacrylate, iso-propyl methacrylate, 3-methyl-1-pentylacrylate, octyl-acrylate, tetradecylacrylate, s-butylacrylate, s-butyl methacrylate, 2-ethylhexyl acrylate, 2-ethylhexyl methacrylate, 2-methoxyethyl acrylate, phenyl acrylate, cyclohexylacrylate, cyclohexylmethacrylate, acrylic acid, methacrylic acid 1,3-butadiene, isoprene, vinyl pyrrolidone, acrylonitrile, methacrylonitrile, vinylimidazole and vinylpyridine, p-methylstyrene, 3,4-dimethyl styrene, m-ethyl styrene, p-butyl styrene, o-methoxy styrene, p-methoxystyrene, 2,6-dimethoxy styrene, isopropyl vinyl ether, isobutyl vinyl ether, vinyl 2-methoxy ethyl ether, n-hexyl vinyl ether, 2-ethylbutyl vinyl ether, n-octadecyl vinyl ether, .alpha.-methylvinyl ethyl ether, cyclohexanol vinyl ether, benzyl alcohol vinyl ether, vinyl phenyl ether, vinyl acetate, vinyl methoxyacetate, vinyl isobutyrate, vinyl oleate, vinyl benzoate, vinyloctylphthalate). Particularly preferred are alkyl(meth)acrylates or cyclo alkyl(meth)acrylates including n-propyl(meth)acrylate, iso-propyl(meth)acrylate, n-butyl(meth)acrylate, sec-butyl(meth)-acrylate, tert-butyl(meth)acrylate, iso-butyl (meth)acrylate, ethylhexyl(meth)acrylate, cyclo-hexyl (meth)acrylate) and (meth)acrylic acid.

The slip- and levelling agent according to the invention may, for example, be a random copolymer, an alternating copolymer or a block copolymer. Preferably the co-polymer is a random copolymer.

A preferred slip- and leveling agent is characterized in that it comprises a copolymer which is obtainable by copolymerizing
A at least one unit of a fluorinated oxetane polymer functionalized with maleic acid;
B a mono-(meth)acrylic functional polydimethylsiloxane or a mono-maleic functional polydimethylsiloxane; and
C an alkyl(meth)acrylate unit, cycloalkyl(meth)acrylate unit or a styrene unit, especially an alkyl(meth)acrylate unit or a cycloalkyl(meth)acrylate unit.

Use:
The slip- and leveling agent according to the invention may be used in a variety of applications, e.g. in coatings and inks and plastics.

Examples are aqueous systems (e.g. emulsion lacquers, such as lacquers based upon polyurethane, alkyds, acrylics, polyester-melamine), water-reducible systems (2K-poly-urethane, alkyd, acrylic, epoxy, vinyl copolymers), (organic) solvent based systems (e.g. polyurethane-based, stoving alkyd/melamine- or polyester/melamine-based, epoxy-based, air-drying alkyds, nitrocellulose, CAB, unsaturated polyesters, acrylics, silicone resins, UV/EB-curing resins, vinyl copolymers, chlorinated rubber) and plastic compounds (hot and ambient curing unsaturated polyesters, epoxy, polyurethanes, polyvinylchloride).

The slip- and leveling agent according to the invention may be present in a product (e.g. such as specified above) within a wide concentration range, of which the skilled professional will be able to determine a suitable concentration for a particular application.

When the slip- and leveling agent is used in aqueous or organic solvent based systems very good results have been achieved with a product comprising A 0.1-10 wt %, preferably 0.2-2.5 wt %, more preferably 0.4-1.5 wt % of a fluorinated oxetane polymer functionalized with an unsaturated dicarboxylic acid;

B 1-20 wt %, preferably 1-10 wt %, more preferably 1-5 wt % of the terminal reactive polysiloxane compound;

C 50-99 wt % alkyl(meth)acrylate units and/or (meth)acrylic acid and/or other unit originating from vinylic compounds that can form radicals.

A copolymer according to the invention or a copolymer used in accordance to the invention preferably has a number average molecular weight in the range of 1,000 to 50,000 g/mol, more preferably in the range of 2,000 to 20,000 g/mol, e.g. in the range of 2,500 to 4,000 g/mol.

Very good results have also been achieved with a copolymer having a polydispersity ($M_w/M_n$) in the range of 1-4, e.g. 1.1-2.

The slip- and levelling agent may be a living copolymer, e.g. obtained by anionic polymerisation, atom transfer mechanism, nitroxide mediated techniques or other controlled polymerisation techniques. A benefit of a living copolymer is its tailor-made molecular architecture, combined with a narrower molecular weight distribution leading to smaller melting ranges and lower viscosities.

Very good results have also been obtained with a copolymer in the form of a liquid or a solid (e.g. a powder), which is soluble in an organic solvent or in water, or made water-soluble after neutralization of acidic moieties. Such a system is particularly suitable for water-based systems. Suitable neutralizing agents for neutralising acidic moieties are e.g. dimethyl-ethanolamine, ammonia, other primary, secondary or tertiary amines or alkali hydroxides. An advantage of using a volatile amine neutralizing agent is that during the drying phase of a paint film, the amine neutralizing agent evaporates, leaving behind a more water resistant copolymer.

In principle, the copolymer according to the invention may be prepared in any way, e.g. by a thermal radical, controlled radical, anionic or cationic polymerisation technique, of which the skilled professional will know how to employ them.

The monomers employed are generally commercially available and/or may be prepared readily according to methods familiar to those skilled in the art.

In order to prepare the leveling agent of the invention the monomers C are copolymerized with monomers A and B. e.g. using thermal random solution polymerisation or using controlled polymerisation.

The invention further relates to compositions comprising a slip- and leveling agent according to the invention.

Such a composition may, for example, further comprise one or more pigments, e.g. chosen from the group consisting of phthalocyanines, carbon black, titanium dioxide, ferrous oxides, alumino silicates, quinacridones, anthroquinones, diketopyrrolo-pyrrole, benzimidazolones and isoindolinones, one or more extenders, e.g. calcium carbonate, barium sulphate, silicium dioxide, alumium trihydroxide, organic fibres, glass and optionally one or more dispersants, e.g. polyurethane dispersants, polyester dispersants, polyacrylate dispersants, polyether derivatives, fatty acid derivatives, alkylsulphates.

The slip- and leveling agents of the invention may very suitably be used in a dispersion, comprising 0-85%, by weight, preferably 3 to 70%, of pigment and/or extender, 0.1-5% by weight, preferably 0.2 to 2% of a copolymer according to the invention, 10-95% by weight, preferably 25 to 40% of a resin, 0-90% by weight preferably 20 to 50% of water and/or non-aqueous liquid and 0-15% by weight preferably 1 to 5% of dispersant.

The invention will now be illustrated by some examples.

EXPERIMENTAL

1. Preparation of the Terminal Reactive Perfluorinated Oxetane Unit (Intermediate)

Intermediate A:

Under a nitrogen atmosphere, maleic anhydride (7 g, 2 equivalent), Polyfox 636 ($M_n$~1100 g/mol, 40 g, 1 equivalent), Xylene (5 g) and Tinstab BL-277 (catalytic) were placed in a reactor at ambient temperature and heated to 40° C. for 20 minutes. The mixture was heated to 110° C. After three hours the intermediate A was obtained as a colorless oil.

In a similar way the intermediate B was prepared:

Intermediate B:

5.52 g of maleic anhydride, 40.0 g Polyfox 656 ($M_n$~1400 g/mol), colorless oil.

Intermediate C:

Under a nitrogen atmosphere, maleic anhydride (2.2 g, 1.1 equivalent), Polyfox AT 1090 ($M_n$~1950 g/mol, 42 g, 1 equivalent), methoxy propylacetate (5 g) and Tinstab BL-277 (catalytic) were placed in a reactor at ambient temperature and heated to 100° C. After four hours the mixture was cooled and 40 g methoxy propylacetate was added. Intermediate C was obtained as a yellowish liquid.

Commercially available Polyfox materials:

Polyfox 636: fluorsurfactant diol with an average $M_n$ of about 1100 g/mol originating from Omnova

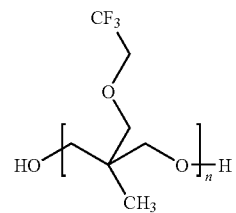

Polyfox 656: fluorsurfactant diol with an average $M_n$ of about 1400 g/mol originating from Omnova

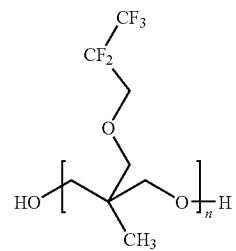

Polyfox AT 1090 fluorsurfactant mono alcohol with an average $M_n$ of about 1950 g/mol originating from Omnova

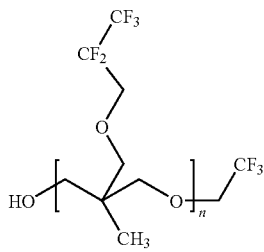

2. Preparation of the Slip- and Leveling Agent

Comparative Example according to WO03/033603.

Xylene (29.0 g) was placed in a reactor under nitrogen atmosphere and heated to reflux (140° C.). The premix consisting of 53.33 g n-butyl acrylate, 14.79 g of i-butyl methacrylate, 0.54 g Zonyl Ba-L-maleate, 1.37 g of di-tert-butyl peroxide was metered in over the course of 3 hours. After addition of the premix, the reaction was carried out for 3 hours at 140° C. The solid content was corrected to 70% by addition of xylene to obtain a colorless clear liquid.

Zonyl BA-L: is mixture of linear fluoroalcohols $R_fCH_2CH_2OH$ with $Rf=C_4F_9<4\%$, $C_6F_{13}$ 50+/−3%, $C_8F_{17}$ 29+/−2%, $C_{10}F_{21}$ 11+/−2% and fluorinated compounds $\geq C_{12}F_{25}$ less than 6%. The average MW of the mixture is 443 g/mol; the mixture is originating from DuPont Examples According to the Invention Xylene (29.0 g) was placed in a reactor under nitrogen atmosphere and heated to reflux (140° C.). The premix consisting of 53.33 g n-butyl acrylate, 14.79 g of i-butyl methacrylate, 0.56 g intermediate A, 1.40 g of Silaplane FM-0721 and 1.37 g of di-tert-butyl peroxide was metered in over the course of 3 hours. After addition of the premix, the reaction was carried out for 3 hours at 140° C. The solid content was corrected to 70% by addition of xylene to obtain a colorless clear liquid.

Compositions of Experiment 1-4

|  | Experiment | | | | | |
| --- | --- | --- | --- | --- | --- | --- |
|  | 1 | 2 | 2a | 3 | 3a | 4 |
| Xylene | 29.00 | 29.00 | 29.00 | 29.00 | 29.00 | 29.00 |
| n-butylacrylate | 53.33 | 53.33 | 53.33 | 53.33 | 53.33 | 53.33 |
| i-butyl methacrylate | 14.79 | 14.79 | 14.79 | 14.79 | 14.70 | 14.79 |
| di-tert-butyl peroxide | 1.37 | 1.37 | 1.37 | 1.37 | 1.37 | 1.37 |
| Intermediate A | 0.56 | 0.56 | 1.68 |  |  |  |
| Intermediate B |  |  |  | 0.56 | 1.04 |  |
| Intermediate C |  |  |  |  |  | 1.00 |
| Silaplane FM-0721 |  | 1.40 | 1.40 | 1.40 | 1.40 | 1.40 |

Silaplane FM-0721: is mono-methacrylic functional polysiloxane with an average $M_n$ of about 5.000 g/mol, originating from CHISSO CORPORATION Application Results:

Anti Crater Performance

A Anti Crater Performance in 2 Pack PU

1) Formulation 2 Pack PU

TABLE 1

| 2 pack PU system/two component PU coating | (g) |
| --- | --- |
| 1 Synthalat A 150 (polyurethane available from Synthapol) | 83.5 |
| 2 Blue colorant (g) | 1.4 |
| 3 Butyl Acetate (g) | 10.4 |
| 4 EFKA-2018 (g) (defoamer) | 4.7 |
| Total | 100.0 |

Items 1 to 3 are combined and shaken for 5 min in a skandex shaker.

After shaking, item 4 is added and mixed in by stirring with spatula until a homogeneous mixture is obtained.

2) Formulations for Testing the Silicone Modified Acrylic Slip- and Leveling Agent

TABLE 2

|  | sample | | | | |
| --- | --- | --- | --- | --- | --- |
|  | 1 | 2 | 3 | 4 | 5 |
|  | Additive content (%) | | | | |
|  | 0% | 0.5% | 1.0% | 1.5% | 2.0% |
| 1 2 pack PU (g) | 74.00 | 73.63 | 73.26 | 72.89 | 72.52 |
| 2 Experiment 1-4 (g) | 0.00 | 0.50 | 1.00 | 1.50 | 2.00 |
| 3 Desmodur N 75 (g) Polyisocyanate resin | 26.00 | 25.87 | 25.74 | 25.61 | 25.48 |
| Total | 100.00 | 100.00 | 100.00 | 100.00 | 100.00 |

Items 1 to 3 are mixed by stirring with a spatula until a homogeneous mixture is obtained.

3) Application, Draw Downs (75 μm) were Prepared of the Samples 1 to 5.

4) Results,

TABLE 3

|  | sample | | | | |
| --- | --- | --- | --- | --- | --- |
|  | 1 | 2 | 3 | 4 | 5 |
|  | 0% | 0.5% | 1.0% | 0.5% | 2.0% |
| Comp. WO03033603 | 8 | 6 | 5 | 5 | 8 |
| Exp. 1 (no silaplane) | 8 | 5 | 4 | 4 | 6 |
| Exp. 2 Interm. A 0.56 | 8 | 5 | 4 | 2 | 3 |
| Ex. 2a Interm. A 1.68 | 8 | 5 | 4 | 3 | 2 |
| Exp. 3 Interm B 0.56 | 8 | 5 | 3 | 2 | 1 |
| Ex. 3a Interm B 1.04 | 8 | 5 | 4 | 3 | 2 |
| Exp. 4 Interm C 1.00 | 8 | 4 | 2 | 3 | 4 |

1 = no craters;
8 = a lot of craters.

Anti Foam Stabilisation and Coefficient of Friction A Performance in Stoving Enamel 1) Formulation Stoving Enamel

TABLE 1

|   | Stoving enamel | (g) |
|---|---|---|
| 1 | Vialkyd AC 451 | 70.5 |
| 2 | Maprenal MF 650 | 19.0 |
| 3 | Butyl Acetate | 10.5 |
|   | Total | 100.0 |

Item 1 to 3 are stirred until homogeneous mixture is obtained.

2) Formulations for Testing the Silicone Modified Acrylic Slip- and Leveling Agent

TABLE 2

| 1 | Stoving enamel (g) | 99.70 |
|---|---|---|
| 2 | Experiment 1-4 (g) | 0.30 |

Items 1 to 3 were mixed and shaken for 30 minutes in a skandex shaker

3) Results Foam Formation

TABLE 3

Visual observation of the foam, 1 = no foam, 8 = a lot of foam

| 0.30% | Blank | Comp | Exp. 1 | Exp. 2 | Ex. 2a | Exp. 3 | Ex. 3a | Exp. 4 |
|---|---|---|---|---|---|---|---|---|
| 0 min | 8 | 8 | 8 | 8 | 8 | 8 | 8 | 8 |
| 5 min | 7 | 6 | 6 | 7 | 7 | 7 | 7 | 7 |
| 10 min | 5 | 5 | 5 | 7 | 7 | 7 | 7 | 6 |
| 15 min | 4 | 3 | 3 | 5 | 5 | 5 | 5 | 5 |
| 20 min | 2 | 1 | 1 | 4 | 4 | 4 | 4 | 3 |
| 25 min | 1 | 1 | 1 | 3 | 3 | 3 | 3 | 2 |
| 30 min | 1 | 1 | 1 | 2 | 2 | 2 | 2 | 1 |
| 35 min | 1 | 1 | 1 | 1 | 1 | 1 | 1 | 1 |

4) Preparation of the Draw Downs

When all foam has been disappeared, a draw down of 75 μm is made on a plastic film Draw downs will be flushed off for 10 minutes.

Bake out time 30 min @135° C.

5) Results Coefficient of Friction (COF)

Coefficient of friction results are shown in the FIG. 1. The dynamic friction was measured at twenty different points.

Average Coefficients of friction (COF)

|   | Dynamic COF | Blank | Ex. 1 | Ex. 2 | Ex. 3 | Ex. 4 |
|---|---|---|---|---|---|---|
| 1 | 0.3% additive | 0.59 | 0.41 | 0.25 | 0.27 | 0.32 |

6) Measurement of the Surface Tension

The surface tension is measured with the pendant drop method.

TABLE 5

Results surface tension

|   | Surface tension (mN/m) |
|---|---|
| Exp. 1 | 28 |
| Exp. 2 | 22 |
| Exp. 2a | 21 |
| Exp. 3 | 20 |
| Exp. 3a | 22 |
| Exp. 4 | 20 |

The invention claimed is:

1. A slip- and leveling agent comprising a copolymer which copolymer is obtained by copolymerizing
   A at least one unit of a fluorinated oxetane polymer functionalized with an unsaturated dicarboxylic acid;
   B at least one terminal reactive polysiloxane unit;
   C at least one alkyl(meth)acrylate unit or cycloalkyl(meth)acrylate unit and/or (meth)acrylic acid and/or other units originating from vinylic compounds that can form radicals.

2. A slip- and levelling agent according to claim 1, comprising a copolymer which copolymer is obtained by copolymerizing
   A 0.1-10 wt % of a fluorinated oxetane polymer functionalized with an unsaturated dicarboxylic-acid;
   B 1-20 wt % of the terminal reactive polysiloxane compound;
   C 50-99 wt % alkyl(meth)acrylate units and/or (meth)acrylic acid and/or other unit originating from vinylic compounds that can form radicals.

3. A slip- and levelling agent according to claim 1, wherein A is represented by formula I,

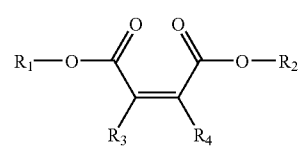

(Formula I)

wherein
$R^1$ is a unit derived from a fluorinated oxetane prepolymer having the structure II

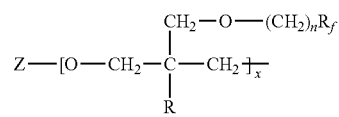

II wherein R is $C_1$-$C_6$-alkyl, $R_f$ is a linear or branched chain perfluorinated alkyl group having 1 to 20 C-atoms, n is 1 to 3, x is 2 to 20; Z is hydrogen or $CF_3CH_2$— or HO—CO—$CR_3$=$CR_4$—CO—, or $R_1$—O—CO—$CR_3$=$CR_4$—CO— where $R_1$ is as defined above;
$R^2$ is hydrogen or $R_1$;
$R^3$ and $R^4$ are independently hydrogen or $C_1$-$C_6$-alkyl or phenyl.

4. A slip- and levelling agent according to claim 3, wherein Rf is —$CF_3$ or —$CF_2$—$CF_3$, and n is 1 and x is 6 to 20 and $R_3$ and $R_4$ are hydrogen and R is methyl or ethyl.

5. A slip- and levelling agent according to claim 1, wherein at least 50% of the fluorinated monomeric units A are mono-esters.

6. A slip- and levelling agent according to claim 1, obtained by polymerizing
- A at least one unit of a fluorinated oxetane polymer functionalized with maleic acid;
- B a mono-(meth)acrylic functional polydimethylsiloxane or a mono-maleic functional polydimethylsiloxane; and
- C an alkyl(meth)acrylate unit, cycloalkyl(meth)acrylate unit or a styrene unit.

7. Coating, printing ink or plastic compound comprising a slip- and leveling agent according to claim 1, a pigment and optionally a dispersant.

8. A dispersion, comprising 0-85% by weight of pigment and/or extender, 0.1-5% by weight of a copolymer according to a claims 1, 10-95% by weight of a resin, 0-90% by weight of water and/or non-aqueous liquid and 0-15% by weight of dispersant.

9. A slip- and levelling agent according to claim 2, wherein A is represented by formula I,

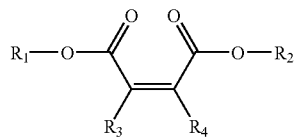

(Formula I)

wherein
$R^1$ is a unit derived from a fluorinated oxetane prepolymer having the structure II

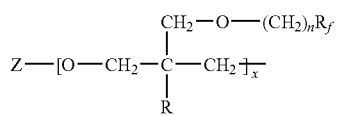

II wherein R is $C_1$-$C_6$-alkyl, Rf is a linear or branched chain perfluorinated alkyl group groups having 1 to 20 C-atoms, n is 1 to 3, x is 2 to 20; Z is hydrogen or $CF_3CH_2$— or HO—CO—$CR_3$=$CR_4$—CO—, or $R_1$—O—CO—$CR_3$=$CR_4$—CO— where $R_1$ is as defined above;
$R^2$ is hydrogen or $R_1$;
$R^3$ and $R^4$ are independently hydrogen or $C_1$-$C_6$-alkyl or phenyl.

10. A slip- and levelling agent according to claim 9, wherein Rf is —$CF_3$ or —$CF_2$—$CF_3$, and n is 1 and x is 6 to 20 and $R_3$ and $R_4$ are hydrogen and R is methyl or ethyl.

11. A slip- and levelling agent according to claim 1, wherein 90-100% of the fluorinated monomeric units A are mono-esters.

12. A slip- and levelling agent according to claim 3, wherein at least 50% of the fluorinated monomeric units A are compounds of formula I wherein $R_2$=H.

13. A slip- and levelling agent according to claim 3, wherein 90-100% of the fluorinated monomeric units A are compounds of formula I wherein $R_2$=H.

* * * * *